United States Patent Office 3,530,300
Patented Sept. 22, 1970

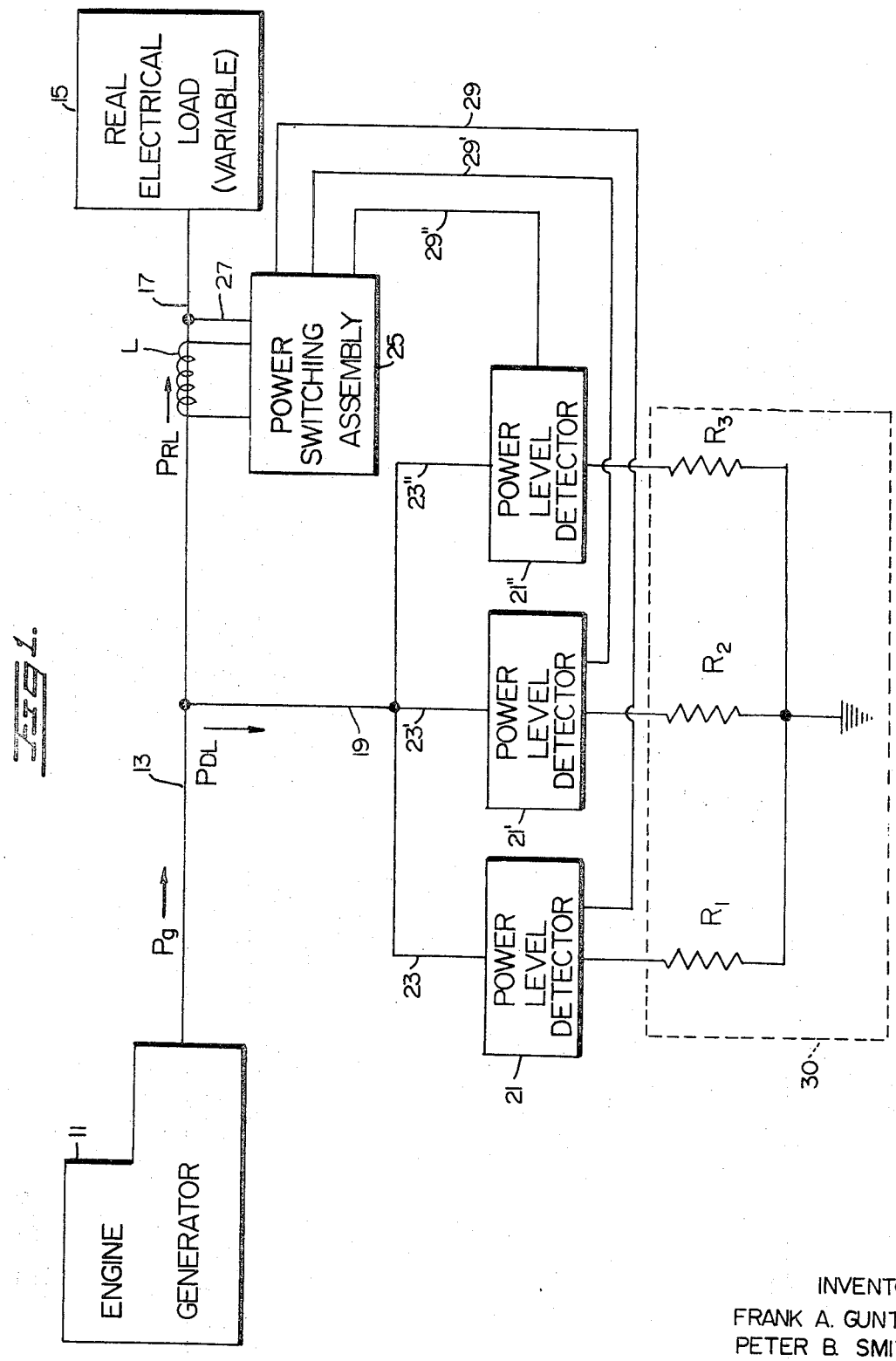

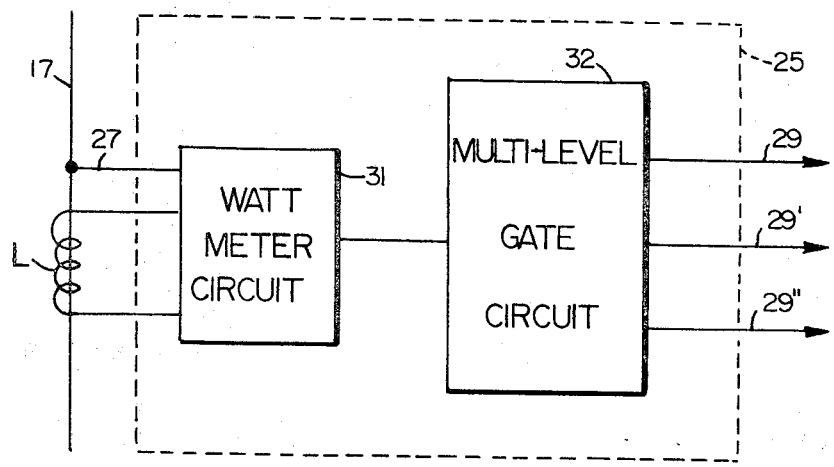
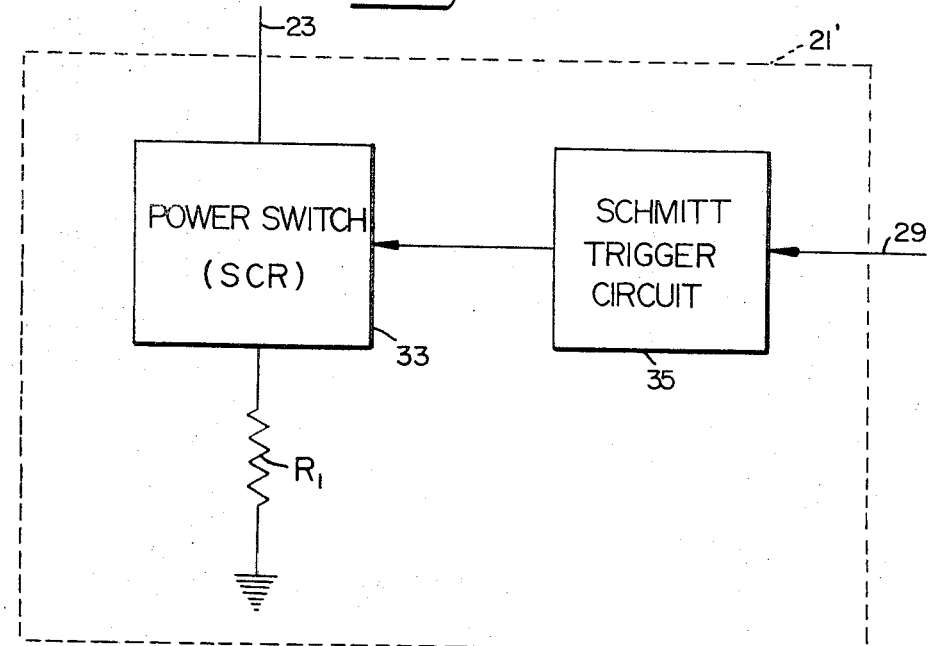

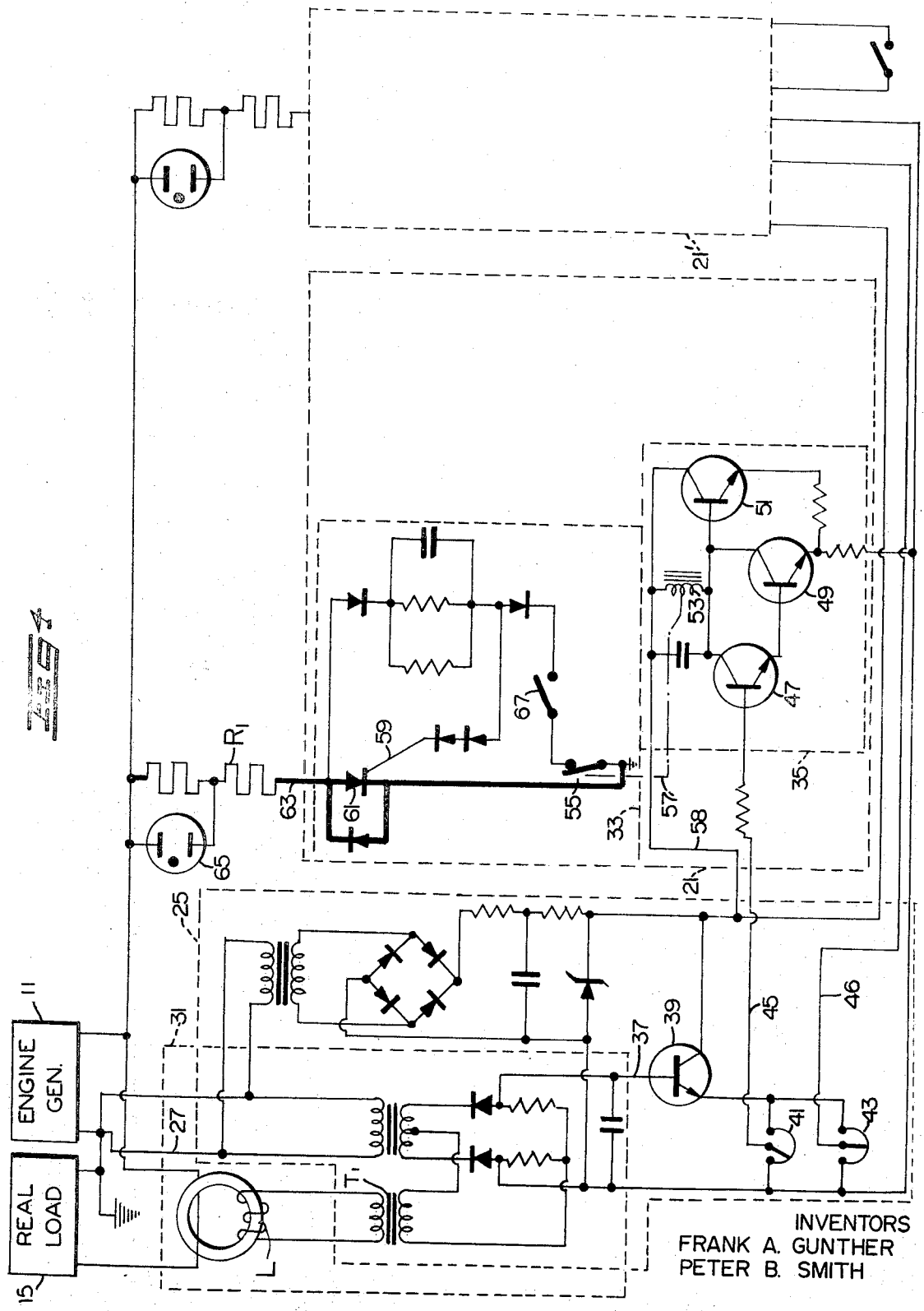

3,530,300
AUTOMATIC LOAD CONTROL FOR GENERATOR ENGINE SETS
Frank A. Gunther, Staten Island, N.Y., and Peter B. Smith, Monroe, Conn., assignors to Dynamics Corporation of America, New York, N.Y., a corporation of New York
Filed Sept. 11, 1968, Ser. No. 759,159
Int. Cl. H02j 3/10
U.S. Cl. 307—33   4 Claims

ABSTRACT OF THE DISCLOSURE

An engine generating system including a generating set for delivering power to a real fluctuating load. A variable dummy load is inter-connected between the generating set and the real load, and is automatically varied in a ratio inversely proportional to the fluctuations of the real load so as to maintain the power output from the generating set substantially constant.

---

This invention relates generally to engine generator sets and more specifically to engine generator sets wherein the system includes a means for providing a constant load to the generator set.

Diesel engine generator sets are in very common use today particularly in the portable or transportable type of sets. These sets have many different requirements depending upon differing load conditions. Such differing requirements create problems with the sets in that fluctuating or changing loads which result in a change in the required output of the engine generator set cause numerous operating and maintenance problems.

Specifically, a maintenance problem occurs when only light loads present themselves to the generator wherein the fuel is not sufficiently burned within the engine, particularly in diesel engines, and, therefore, the unburnt fuel forms tar and carbon deposits and generally fouls up the engine and shortens the engine life.

A further problem created by fluctuating loads is the resultant frequency and voltage transients which fluctuate with the load. Frequency and voltage transients in applications where critical loads are involved are highly undesirable if not prohibitive.

Accordingly, it is an object of this invention to provide, continuously and automatically, a minimum constant load on an engine generator set irrespective of the bus or real load which is being serviced by the set, thereby minimizing the buildup of carbon and other contaminants that occur in a lightly loaded engine.

A further purpose is to provide a constant load for the engine generator set so as to minimize frequency and voltage transients caused by changing real loads.

These and other objects of the invention will be more clearly understood from the following description when taken in conjunction with the drawings wherein:

FIG. 1 is a schematic diagram showing the overall system of the present invention;

FIG. 2 is a schematic diagram of the power switching assembly of FIG. 1;

FIG. 3 is a schematic diagram of one of the power level detectors shown in FIG. 1; and FIG. 4 is a schematic diagram of one embodiment of the present invention.

Basically, the present invention comprises an engine generating system having a generating set, such as a diesel generating set, with a first circuit means connecting the generating set to a real load which fluctuates over a period of time. A variable dummy load is coupled to the generating set by a second circuit means. The dummy load includes a control system within the second circuit means for coupling the dummy load to the output of the generating set in a ratio inversely proportional to the variations of the fluctuating real load.

In discussing the present invention the use of the term "real load" defines the actual bus load that is being serviced by the generating set and which load fluctuates due to the various load requirements for the particular operation. The term "dummy load" defines a load such as a resistance or a plurality of resistances which may be coupled to the output of the generating set and which merely dissipate the power without serving any useful work product.

Turning now more specifically to the drawings, there is shown a standard engine generator set 11 having a power output $P_g$ coupled by line 13 and line 17 to a real electrical load 15 which is variable as discussed above. The power to the real load is shown as $P_{RL}$.

A line 19 is connected between the lines 13 and 17 and the dummy load and carries the power $P_{DL}$ which is delivered to the dummy load. The dummy load, as shown in FIG. 1, includes resistances $R_1$, $R_2$ and $R_3$ which together comprise load 30 as indicated by the dotted line.

In order to accomplish the functional operation required by the present invention, the follow equation must be satisfied:

$$P_g = P_{RL} + P_{DL}$$

Since it is desired that the power from the engine generator set 11 $P_g$ remain constant, then it will be seen from the above equation that as $P_{RL}$ increases then $P_{DL}$ must decrease in a like amount and as $P_{RL}$ decreases $P_{DL}$ must increase in a like amount. In other words, $P_{DL}$, the dummy load, must vary in a ratio inversely proportional to the real load, $P_{RL}$.

This result is achieved by switching the required dummy load into the circuit in accordance with changes in the real load 15.

The switching is accomplished, broadly as shown in FIG. 1, through the use of a power switching assembly 25 which senses the current in line 17 by means of coil L and senses the voltage in line 17 through line 27 in order to determine the power output $P_{RL}$. The sensed voltage output is used to control the various power level detectors 21, 21' and 21" which, in effect, open the lines 23, 23' and 23" to the various resistors $R_1$, $R_2$ and $R_3$ as required to satisfy the above equation.

Turning now to FIG. 2 there is shown the two basic parts of the power switching assembly, e.g., a watt meter circuit 31, which derives its output from the current and voltage within line 17, with its output coupled to a multi-level gate circuit 32 which in turn provides the outputs as shown to the three power level detectors by means of lines 29, 29' and 29".

There is shown in FIG. 3, the basic elements which comprise each power level detector, such as level detecor 21. A power switch, such as a silicon controlled rectifier 33, is connected to the input line 23 which, as shown in FIG. 1, is coupled to line 19. The output of power switch 33 is coupled to a resistance $R_1$. A Schmitt trigger circuit 35 is coupled to one of the outputs 29 from the power switching assembly 25 as shown in FIG. 2, and when circuit 35 is triggered, SCR in switch 33 is opened and the line 23 is connected directly through $R_1$ to ground, thereby supplying a dummy load. It is to be understood that the number of resistances shown, and the associated cation may be varied to fit the specific needs as governed by the type of load and the fluctuations that occur herein.

In essence, each power level detector will have associated with it a resistive dummy load and the power switching assembly 25 will control the operation of the individual power level detectors so as to provide coupling of the resistances to generator set 11 in specific steps as required by the varying load fluctuations.

Turning now to FIG. 4, there is shown a specific schematic of one embodiment of the basic system as described above.

It will be seen that the power switching assembly 25 includes the watt meter circuit 31 which is shown as deriving the power output of the generator set to the real load 15 by means of coil L and transformer $T_1$ and deriving a voltage through line 27 and transformer $T_2$ so as to provide an ultimate output signal which is proportional to the wattage $P_{RL}$ being delivered to the real load 15. This output signal is coupled to the amplifier 39 which is directly connected to rheostats 41 and 43 as illustrated in the drawing. In this embodiment there are shown two rheostats to indicate the use of a plurality of dummy load devices. Since all of the power level detectors are essentially identical, only one detector, such as detector 21, is shown in detail. Detector 21' is roughly shown as a block form and it is to be understood that any number of detectors and associated rheostats could be added to the system shown in FIG. 4.

Essentially, rheostats 41 and 43 comprise the gate circuit 32 shown in FIG. 2. Thus, the particular setting of each rheostat controls the point at which the associated dummy load is connected to the generator set. Since the output of the amplifier 39 passes through the rheostats, then the output from the amplifier to lines 45 and 46 is controlled by setting of the rheostats. Line 45 is connected to Schmitt trigger circuit 33 comprising transistors 47, 49 and 51 together with the relay coil 53 which operates normally closed switch 55 by means of a mechanical coupling 57. This switch in its preferred embodiment would be a reed type switch. The normal power supply circuit is shown as coupled to the Schmitt trigger circuit through line 58.

When the detected level is reached, the Schmitt trigger circuit operates so as to open switch 55 thereby removing the control signal which is supplied through a series of diodes, to gate 59 of the silicon controlled rectifier 61. The removal of the gate signal opens rectifier 61 and connects the power supply directly to resistance $R_1$ through line 60 thus maintaining the load as a dummy load connected to the generator so long as the silicon controlled rectifier remains open. There is shown a neon tube 65 which glows to indicate that power is being supplied to that particular dummy load. It will be understood that further rheostats such as rheostat 43 are set at differing control levels so that individual resistive loads may be added as required.

In order that the dummy load may be inserted manually for any particular reason there is also provided a manual switch 67 which in effect bypasses the reed control switch 55 operated by the Schmitt trigger circuit.

As stated above, the other particular power level detectors 21', etc., operate in substantially the same fashion and each have their own rheostat, such as rheostat 43 for detector 21', inorder to provide the multilevel gate circuit control.

It is to be understood that the above description and the accompanying drawings are illustrative only since various components could be changed and without departing from the concept of the present invention. One particular note should be made that the system in FIG. 3 is shown as a control for a single phase generator set. It would be obvious that all of the described components could be increased so as to control a 3-phase generator set and load in like manner. Accordingly, the scope of the invention is not to be limited by the illustrative embodiment of the drawings and related description.

We claim:
1. An electrical generating system comprising,
   an engine generating set;
   first circuit means connecting said generating set to a fluctuating load;
   a variable dummy load;
   second circuit means coupling said dummy load to said generating set;
   a power switching assembly for detecting the power in said first circuit means; and
   at least one power level detector in said second circuit means connected and actuated by said power switching assembly, said power level detector connecting said dummy load to said generating set when actuated.
2. The system of claim 1 wherein said power switching assembly comprises,
   a wattmeter coupled to said first circuit means; and
   a multilevel gate circuit coupled to the output of said wattmeter, the output of said multilevel gate circuit being connected to said power level detector.
3. The system of claim 2 wherein said power level detector comprises,
   a trigger circuit connected to and actuated by the output of said multilevel gate circuit; and
   a power switch connected to and operated by said trigger circuit, said power switch connecting said dummy load to a generator set when actuated.
4. The system of claim 3 wherein said power switch comprises, a silicon controlled rectifier having its gate electrode coupled to and controlled by said trigger circuit.

References Cited
UNITED STATES PATENTS
448,279   3/1891   Thomson _____ 307—33

ROBERT K. SCHAEFER, Primary Examiner

H. J. HOHAUSER, Assistant Examiner